(12) United States Patent
Masuda et al.

(10) Patent No.: US 12,288,659 B2
(45) Date of Patent: Apr. 29, 2025

(54) POWER SUPPLY CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryosuke Masuda, Yokkaichi (JP); Masayuki Kato, Yokkaichi (JP); Shunichi Sawano, Yokkaichi (JP); Ryohei Sawada, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 15 days.

(21) Appl. No.: 18/260,953

(22) PCT Filed: Dec. 28, 2021

(86) PCT No.: PCT/JP2021/048786
§ 371 (c)(1),
(2) Date: Jul. 11, 2023

(87) PCT Pub. No.: WO2022/153872
PCT Pub. Date: Jul. 21, 2022

(65) Prior Publication Data
US 2024/0071705 A1 Feb. 29, 2024

(30) Foreign Application Priority Data
Jan. 12, 2021 (JP) .................................. 2021-003054

(51) Int. Cl.
*H01H 85/02* (2006.01)
*H01H 85/143* (2006.01)
*B60R 16/03* (2006.01)

(52) U.S. Cl.
CPC ...... *H01H 85/0241* (2013.01); *H01H 85/143* (2013.01); *B60R 16/03* (2013.01);
(Continued)

(58) Field of Classification Search
CPC .................................................... B60R 16/03
See application file for complete search history.

(56) References Cited

U.S. PATENT DOCUMENTS 4,661,793 A * 4/1987 Borzoni ............. H01H 85/0417
337/260
6,351,361 B1 2/2002 Kawazu et al.
(Continued)

FOREIGN PATENT DOCUMENTS

JP    S56-078203 U    6/1981
JP    2000-208558 A   7/2000
(Continued)

OTHER PUBLICATIONS

International Search Report, Application No. PCT/JP2021/048786, mailed Mar. 8, 2022. ISA/Japan Patent Office.

*Primary Examiner* — Jared Fureman
*Assistant Examiner* — Esayas G Yeshaw
(74) *Attorney, Agent, or Firm* — Honigman LLP (57) ABSTRACT

A power supply control device is to be installed in a vehicle. The power supply control device controls power supply via a semiconductor switch and a fuse by turning the semiconductor switch ON or OFF. The semiconductor switch and the fuse are mounted on a circuit board. In the fuse, two long plate-shaped terminals are arranged in a row. The fusing portion and a part of the two terminals are covered with a
(Continued)

housing having heat resistance. The two terminals are disposed in a current path of a current flowing through the semiconductor switch. The current flows through the fusing portion. If the temperature of the fusing portion exceeds a predetermined temperature, the fusing portion is fused.

11 Claims, 7 Drawing Sheets

(52) U.S. Cl.
CPC ........... *H01H 2085/0275* (2013.01); *H01H 2085/0283* (2013.01)

(56) References Cited

U.S. PATENT DOCUMENTS

| | | |
|---|---|---|
| 2006/0119463 A1 | 6/2006 | Kubota |
| 2013/0236752 A1* | 9/2013 | Yang ................... H01M 50/595 |
| | | 429/61 |
| 2015/0072188 A1* | 3/2015 | Dulle ..................... B60L 58/21 |
| | | 429/61 |
| 2019/0016229 A1* | 1/2019 | Sato ....................... B60L 58/10 |
| 2022/0190586 A1* | 6/2022 | Zimmermann .......... H02H 3/44 |
| 2024/0034253 A1* | 2/2024 | Poulis ................. B60R 16/0238 |

FOREIGN PATENT DOCUMENTS

| | | | | |
|---|---|---|---|---|
| JP | 2006-318768 A | 11/2006 | | |
| JP | 2008311191 A | * 12/2008 | ............. | H01H 85/50 |
| JP | 2011-076772 A | 4/2011 | | |
| JP | 2014220924 A | * 11/2014 | ............ | B60R 16/02 |
| JP | 2017-130285 A | 7/2017 | | |
| JP | 2019-041508 A | 3/2019 | | |

* cited by examiner

POWER SUPPLY CONTROL DEVICE

CROSS-REFERENCE TO RELATED APPLICATIONS

This application is the U.S. national stage of PCT/JP2021/048786 filed on Dec. 28, 2021, which claims priority of Japanese Patent Application No. JP 2021-003054 filed on Jan. 12, 2021, the contents of which are incorporated herein.

TECHNICAL FIELD

The present disclosure relates to a power supply control device.

BACKGROUND

JP 2011-76772A discloses a fuse for preventing an overcurrent from flowing through an electrical device. This fuse is a so-called blade type fuse. In a blade-type fuse, two terminals are formed in a long plate shape. The two terminals are connected to a fusing portion. The fusing portion and a part of the two terminals are covered with a housing. A current flows through the one terminal, the fusing portion, and the other terminal in this order. An overcurrent is prevented from flowing by the fusing portion being fused.

In JP 2011-76772A, a fuse holder into which the blade-type fuse is inserted is mounted on a circuit board. When the fusing portion of the fuse is fused, the fuse is removed from the fuse holder and a new fuse is inserted into the fuse holder.

JP 2019-41508A discloses, as an on-board device including a fuse, a power supply control device that controls power supply from a battery to a load. In this power supply control device, a fuse and a semiconductor switch are disposed in a current path of a current flowing from a battery through a load. The power supply to the load is controlled by turning the semiconductor switch ON or OFF. When the current value of the current flowing through the fuse becomes larger than or equal to a certain value, the fuse is fused. Therefore, an overcurrent is prevented from flowing through the load.

An example of an on-board device is a power supply control device including a fuse holder disclosed in JP 2011-76772A. In this configuration, the power supply control device is realized by inserting a blade type fuse into a fuse holder. In this configuration, because the fuse holder is mounted on a circuit board, there is a problem that the size of the power supply control device is large. Because a large number of devices are disposed in a limited area in a vehicle, it is preferable that the size of the power supply control device is small.

As a method for realizing a small-sized power supply control device, there is a method of directly mounting a blade-type fuse on a circuit board by soldering. Usually, many components other than a fuse are mounted on a circuit board by soldering. A reflow method is known as a method for mounting components on a circuit board by soldering. In a reflow method, a paste-like solder is applied onto circuit board plating portions covering the circuit board, and the electrodes of the components are disposed on the solder portions, respectively. In this state, hot air is blown onto the circuit board or the circuit board is irradiated with infrared rays. As a result, the solder melts and the electrodes of the components and the circuit board plating portions are respectively connected by the solder.

When components other than the fuse are installed on the circuit board by a reflow method, it is preferable that the blade-type fuse is also mounted on the circuit board by the reflow method in order to realize the step of mounting all the components on the circuit board at low cost. However, a blade-type fuse is manufactured on the assumption that the fuse is inserted into a fuse holder. For this reason, a blade-type fuse is not a component suitable to be mounted by a reflow method at present.

Therefore, it is an object of the present disclosure to provide a power supply control device including a fuse suitable to be mounted on a circuit board by a reflow method.

SUMMARY

A power supply control device according to an aspect of the present disclosure is a vehicle power supply control device that controls power supply via a semiconductor switch by switching the semiconductor switch ON or OFF, including: a fuse; and a circuit board on which the semiconductor switch and the fuse are mounted, wherein the fuse includes a plurality of long plate-shaped terminals arranged in a row; a fusing portion connected to two terminals of the plurality of terminals; and a housing covering and the fusing portion and a part of the terminals, the two terminals of the plurality of terminals are arranged in a current path of a current flowing through the semiconductor switch, the current flows through the fusing portion, the fusing portion is fused when a temperature of the fusing portion exceeds a predetermined temperature, and the housing is heat-resistant.

Effects of the Present Disclosure

According to the present disclosure, a fuse is suitable to be mounted on a circuit board by a reflow method.

DETAILED DESCRIPTION OF PREFERRED EMBODIMENTS

First, embodiments of the present disclosure will be listed and described. At least some of the embodiments described below may also be combined as appropriate.

A power supply control device according to an aspect of the present disclosure is a power supply control device for a vehicle that controls power supply via a semiconductor switch by switching the semiconductor switch ON or OFF, including: a fuse; and a circuit board on which the semiconductor switch and the fuse are mounted, wherein the fuse includes: a plurality of long plate-shaped terminals arranged in a row; a fusing portion connected to two terminals of the terminals; and a housing covering a part of the terminals and the fusing portion, the two terminals of the terminals are arranged in a current path of a current flowing through the semiconductor switch, the current flows through the fusing portion, the fusing portion is fused when a temperature of the fusing portion exceeds a predetermined temperature, and the housing is heat-resistant.

In the above aspect, when the components are mounted on the circuit board by a reflow method, hot air is blown onto the housing, or the housing is irradiated with infrared rays. As a result, the temperature of the housing rises. When the temperature of the housing is lower than or equal to X degree Celsius, no deformation or melting occurs in the housing. Here, X is a positive real number. If no deformation or melting occurs in the housing, the shape of the housing is maintained. Heat resistant means that X is 250 or more. The housing is heat-resistant. For this reason, the housing is not melted or deformed by being blown with hot air or being irradiated with infrared rays. Therefore, the fuse is suitable to be mounted on the circuit board by a reflow method.

In the power supply control device according to an aspect of the present disclosure, the housing has heat resistance to heat of 300 degree Celsius or higher.

In the above aspect, the housing has heat resistance to heat of 300 degree Celsius or higher. Accordingly, the aforementioned X is 300 degree Celsius or higher. Therefore, the fuse is very suitable to be mounted on the circuit board by a reflow method.

The power supply control device according to an aspect of the present disclosure includes a detection unit configured to detect a voltage value between the two terminals of the fuse disposed in the current path.

In the above aspect, the fusing portion of the fuse is used as a resistor for detecting the voltage value of the fuse.

In the power supply control device according to an aspect of the present disclosure, the circuit board is provided with an insulating substrate, a plurality of through holes passing through the insulating substrate, and a plurality of substrate plating portions covering the insulating substrate, wherein the terminals of the fuse are respectively inserted into the plurality of through holes, and are respectively connected to the substrate plating portions by soldering.

In the above aspect, the plurality of terminals of the fuse are respectively inserted into the plurality of through holes. Then, the plurality of terminals are respectively connected to the plurality of substrate plating portions by soldering. As a result, the fuse is mounted on the circuit board.

In the power supply control device according to an aspect of the present disclosure, the terminals each include a metal body and terminal plating made of tin and covering a surface of the metal body.

In the above aspect, the surface of the metal body of each terminal is covered with the terminal plating made of tin. The solder usually contains a tin component. Therefore, a terminal having tin terminal plating is compatible with solder, that is, has high wettability. For this reason, the solder strongly adheres to the terminal.

In the power supply control device according to an aspect of the present disclosure, the terminals each include a first plate portion having a long plate shape and partially covered with the housing, and a second plate portion coupled to the first plate portion, in each of the terminals, one end portion of the first plate portion protrudes from a common surface of the housing, the second plate portion protrudes from a portion of a distal end surface of the first plate portion protruding from the housing, and a cross-sectional area of the second plate portion is smaller than a cross-sectional area of the first plate portion.

In the above aspect, the second plate portion protrudes from the distal end surface of the first plate portion protruding from the housing, and a level difference is formed therebetween. In the circuit board, the through holes are provided in the insulating substrate, and in the insulating substrate, inner surfaces of the through holes and peripheral edge portions of the through holes are covered with substrate plating. For example, in each through hole, the area of the through hole is slightly larger than the cross-sectional area of the second plate portion. In this case, when the second plate portion is inserted into the through hole, the first plate portion does not pass through the through hole, but comes into contact with the substrate plating portion covering the peripheral edge portion of the through hole. At this time, the housing is away from the circuit board by the first plate portion. In this case, when the terminals are mounted on the circuit board by soldering, fillet-shaped solders are easily formed. The formation of the fillet-shaped solder means that the fuse has been well mounted on the circuit board.

In addition, the terminals are inserted into the respective through holes in a state in which solder paste is applied onto the substrate plating portions. As described above, because a level difference is formed in each of the terminals, when the terminals are inserted into the respective through holes, the housing does not come into contact with the solder paste. For this reason, when the solder is melted by a reflow method, there is a low possibility that a ball-shaped solder is formed.

Furthermore, the cross-sectional area of the second plate portion is smaller than the cross-sectional area of the first plate portion, and the second plate portion is thin. Accordingly, as the through hole into which the second plate portion is inserted, a through hole having a small area can be used. In this case, a gap between the second plate portion and the through hole is small. Accordingly, for example, even when hot air is blown onto the housing, the second plate portion, that is, the fuse, is not largely inclined, and the housing stands substantially perpendicular to the plate surface of the circuit board. As a result, when the fuse is mounted on the circuit board by a reflow method, it is not necessary to fix the housing substantially perpendicular to the plate surface of the circuit board with a jig, and the fuse can be mounted on the circuit board at low cost.

DETAILED DESCRIPTION OF EMBODIMENTS OF THE PRESENT DISCLOSURE

A specific example of a power source system according to an embodiment of the present disclosure will be described below with reference to the drawings. Note that the present disclosure is not limited to the following examples, but rather is defined by the claims, and all changes that come within the meaning and range of equivalency of the claims are intended to be embraced therein.

First Embodiment

Configuration of Power Source System

Figure 1:
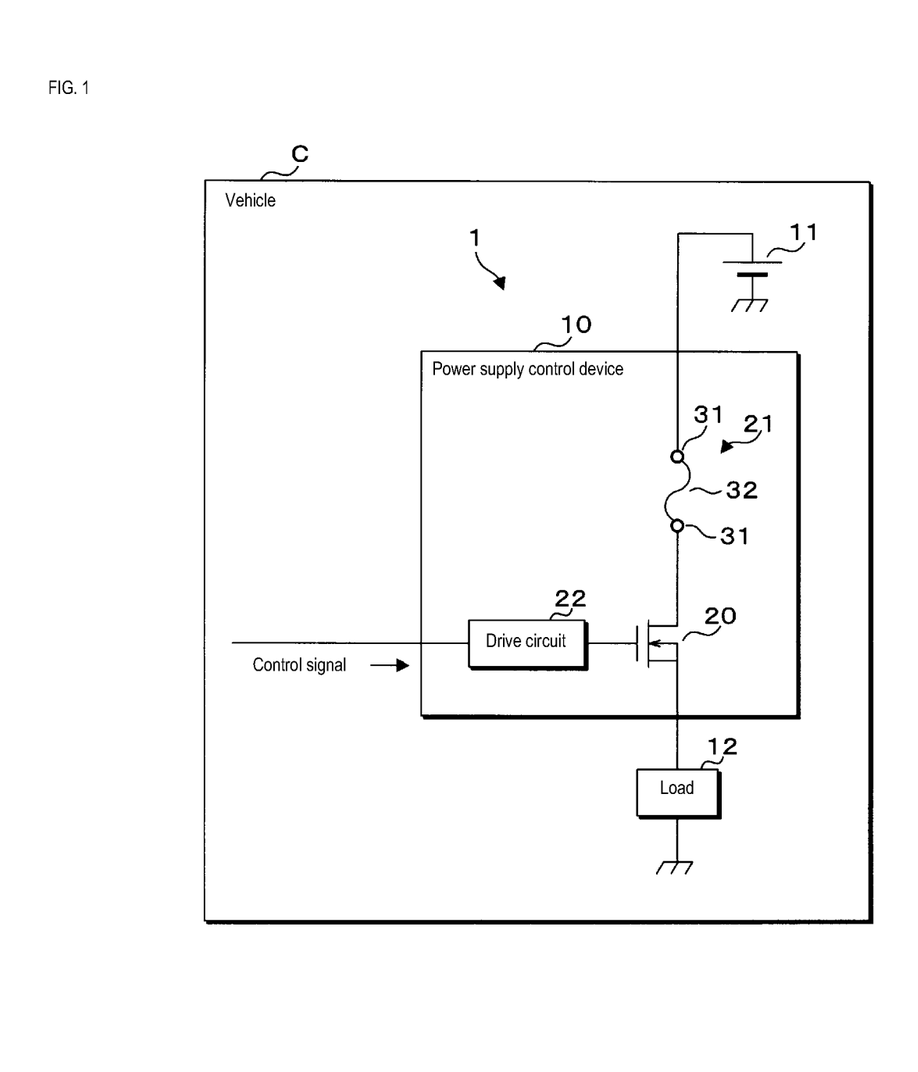
FIG. 1 is a block diagram showing a configuration of main portions of a power source system according to a first embodiment.

FIG. 1 is a block diagram showing a configuration of main portions of a power source system 1 according to a first embodiment. The power source system 1 is installed in a vehicle C. The power source system 1 includes a power supply control device 10, a direct current (DC) power source 11, and a load 12. The DC power source 11 is a battery, for example. The power supply control device 10 is connected to a positive electrode of the DC power source 11. The power supply control device 10 is connected to one end of the load 12. The negative electrode of the DC power source 11 and the other end of the load 12 are grounded.

The DC power source 11 supplies power to the load 12 through the power supply control device 10. The load 12 is an electrical device. Upon power being supplied to the load 12, the load 12 operates. When the supply of power to the load 12 is stopped, the load 12 stops operating. The power supply control device 10 controls the supply of power from the DC power source 11 to the load 12.

Configuration of Power Supply Control Device 10

The power supply control device 10 includes a semiconductor switch 20, a fuse 21, and a drive circuit 22. The semiconductor switch 20 is an N-channel FET (Field Effect Transistor). The fuse 21 includes two terminals 31 and a fusing portion 32. The two terminals 31 are connected to each other by the fusing portion 32.

One terminal 31 of the fuse 21 is connected to the positive electrode of the DC power source 11. The other terminal 31 of the fuse 21 is connected to the drain of the semiconductor switch 20. The source of the semiconductor switch 20 is connected to one end of the load 12. The gate of the semiconductor switch 20 is connected to the drive circuit 22.

In the semiconductor switch 20, when the voltage value of the gate whose reference potential is the potential of the source is higher than or equal to a certain voltage value, the semiconductor switch 20 is in an ON state. When the semiconductor switch 20 is ON, a current flows through the drain and the source of the semiconductor switch 20. In the semiconductor switch 20, when the voltage value of the gate whose reference potential is the potential of the source is lower than the certain voltage value, the semiconductor switch 20 is in an OFF state. When the semiconductor switch 20 is OFF, no current flows through the drain and source of the semiconductor switch 20.

A control signal including a high-level voltage and a low-level voltage is input to the drive circuit 22. When the voltage of the control signal is switched from the low-level voltage to the high-level voltage, the drive circuit 22 increases the voltage of the gate whose reference potential is the ground potential. As a result, the voltage value of the gate whose reference potential is the potential of the source increases to the certain voltage value or higher, and the semiconductor switch 20 is turned ON. When the semiconductor switch 20 is turned ON, a current flows from the positive electrode of the DC power source 11 to the semiconductor switch 20, the fuse 21, and the load 12 in this order, and power is supplied to the load 12. As a result, the load 12 operates.

In the fuse 21, a current flows through the terminal 31, the fusing portion 32, and the terminal 31 in this order. Accordingly, the two terminals 31 of the fuse 21 are disposed in the path of the current flowing through the semiconductor switch 20.

When the voltage of the control signal is switched from the high-level voltage to the low-level voltage, the drive circuit 22 lowers the voltage of the gate whose reference potential is the ground potential. As a result, the voltage value of the gate whose reference potential is the potential of the source decreases to lower than the certain voltage value, and the semiconductor switch 20 is turned OFF. When the semiconductor switch 20 is turned OFF, the flow of current from the DC power source 11 to the load 12 is stopped, and the supply of power to the load 12 is stopped. As a result, the load 12 stops operating.

As described above, the drive circuit 22 turns the semiconductor switch 20 ON or OFF depending on the voltage of the control signal. The supply of power to the load 12 through the semiconductor switch 20 is controlled by the drive circuit 22 turning the semiconductor switch 20 ON or OFF.

When the semiconductor switch 20 is ON, a current flows through the load 12 via the fusing portion 32 of the fuse 21. When the current flows through the fusing portion 32, the fusing portion 32 generates heat. The larger the current value of the current flowing through fusing portion 32 is, the larger the amount of heat generated by fusing portion 32 is. With respect to the fusing portion 32 of the fuse 21, when the amount of heat generation per unit time is larger than the amount of heat dissipation per unit time, the temperature of the fusing portion 32 rises. When the temperature of the fusing portion 32 exceeds a predetermined temperature, for example, 420 degree Celsius, the fusing portion 32 is fused.

If the fusing portion 32 is fused, the flow of the current from the DC power source 11 to the load 12 is stopped, and the supply of power to the load 12 is stopped. If the current value of the current flowing through the load 12 is higher than or equal to a certain reference current value, the temperature of the fusing portion 32 exceeds the predetermined temperature, and the fusing portion 32 is fused. This configuration prevents an overcurrent from flowing through the load 12 via the semiconductor switch 20.

Circuit Configuration of Power Supply Control Device 10

Figure 2:
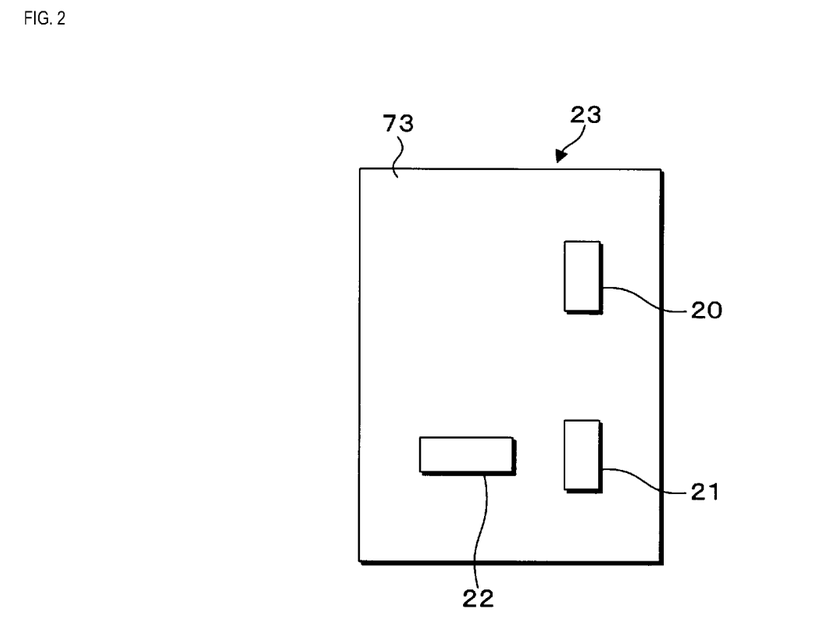
FIG. 2 is a diagram illustrating a circuit configuration of a power supply control device.

FIG. 2 is a diagram illustrating a circuit configuration of the power supply control device 10. The power supply control device 10 further includes a circuit board 23 having a rectangular plate shape. FIG. 2 shows a plan view of the circuit board 23. The semiconductor switch 20, the fuse 21, and the drive circuit 22 are mounted on the surface of the circuit board 23. The plate face is the broad face of the plate.

The drive circuit 22 may be mounted on a circuit board different from the circuit board 23.

Hereinafter, a configuration of the fuse 21 and a state in which the fuse 21 is mounted on the circuit board 23 will be described.

Configuration of Fuse 21

Figure 3:
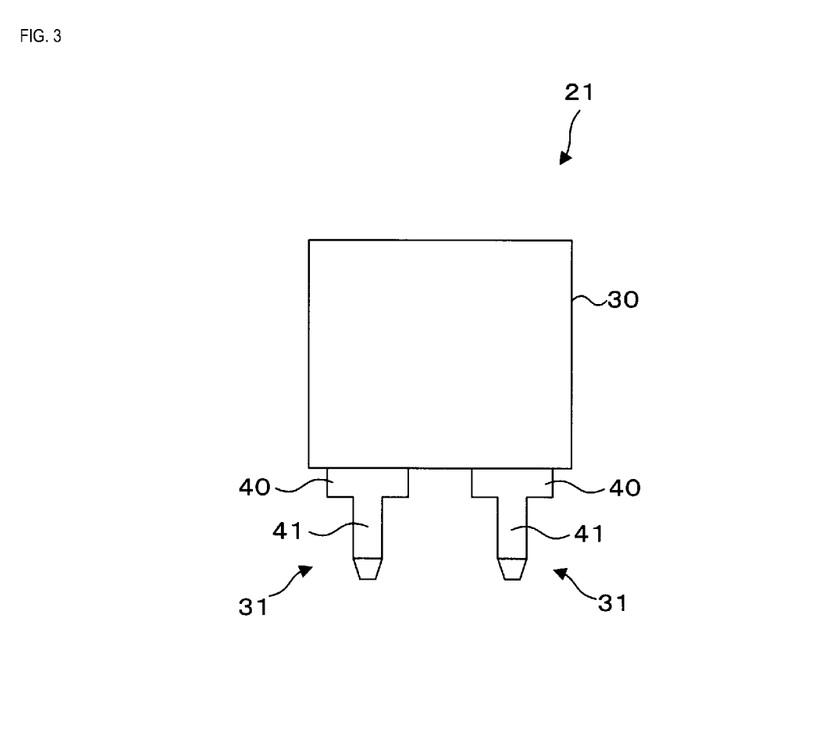
FIG. 3 is a front view of a fuse.
Figure 4:
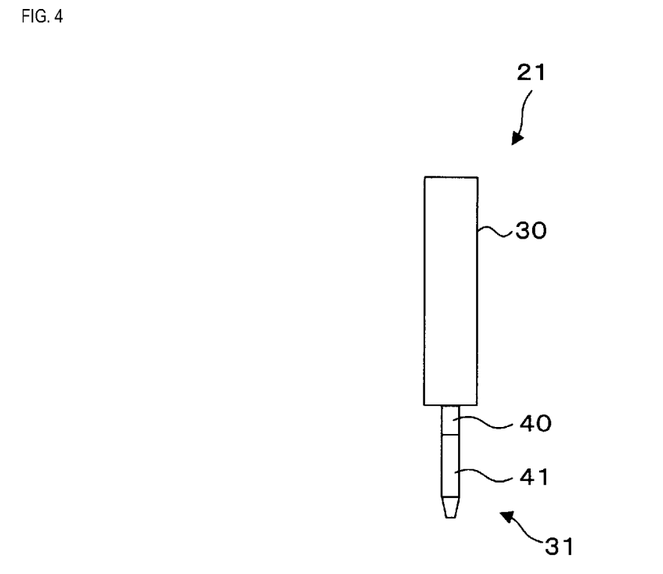
FIG. 4 is a side view of the fuse.

FIG. 3 is a front view of the fuse 21. FIG. 4 is a side view of the fuse 21. The fuse 21 has a housing 30 made of resin. As shown in FIGS. 3 and 4, in the fuse 21, two terminals 31 protrude from a common surface of the housing 30. The terminals 31 have conductivity.

Figure 5:
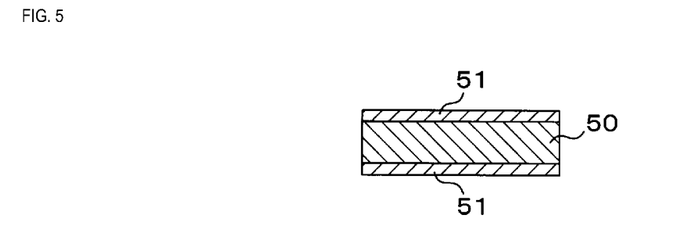
FIG. 5 is a cross-sectional view of a terminal.

FIG. 5 is a cross-sectional view of the terminal 31. The terminals 31 each have a long plate-like metal body 50. In each terminal 31, plate surfaces on both sides of the metal body 50 are covered with terminal plating 51 made of tin (Sn). As described above, the plate surface is the wide surface of the plate. The metal body 50 is exposed on the side surface of each terminal 31. The metal body 50 and the terminal plating 51 have conductivity. The metal body 50 is manufactured using a zinc alloy, for example. In the drawings other than FIG. 5, the metal body 50 and the terminal plating 51 are omitted.

The terminal plating 51 may cover surfaces of the metal body 50 different from the plate surfaces, such as, side surfaces.

Figure 6:
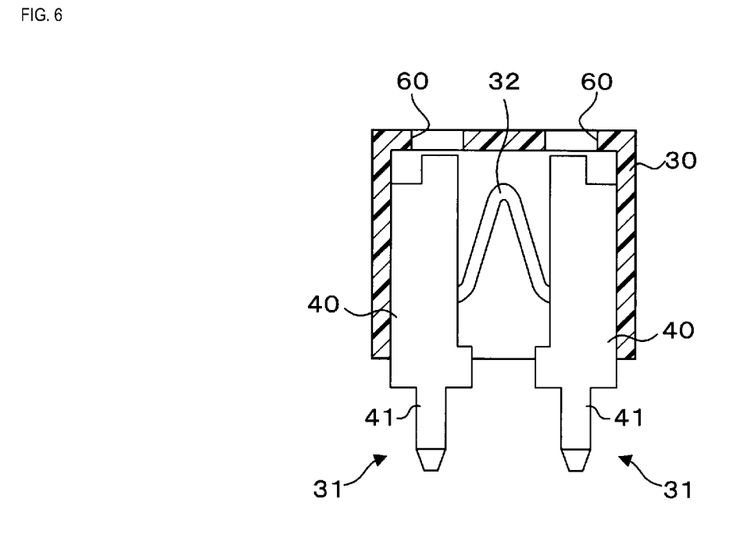
FIG. 6 is a cross-sectional view of the fuse.

FIG. 6 is a cross-sectional view of the fuse 21. As shown in FIGS. 3, 4 and 6, the housing 30 has a box-like shape with one side open. Parts of the two terminals 31 are covered by the housing 30. As described above, the two terminals 31 protrude from a common surface of the housing 30. Here, the common surface is the open surface of the housing 30, and is located on a lower side of the housing shown in FIGS. 3, 4 and 6. As shown in FIG. 6, the two terminals 31 are arranged in a row inside the housing 30. The fusing portion 32 has a rod shape. As described above, the fusing portion 32 connects the two terminals 31. The fusing portion 32 has conductivity. The fusing portion 32 is also covered with the housing 30.

Figure 7:
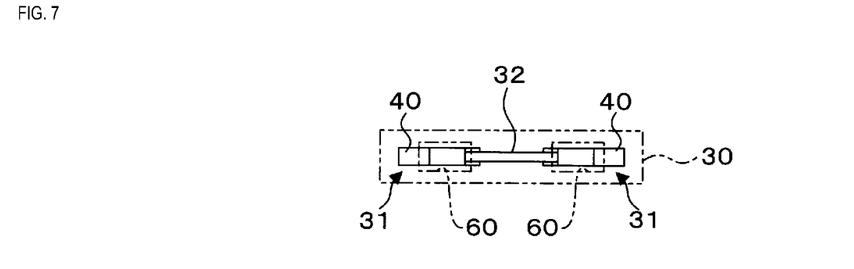
FIG. 7 is a diagram illustrating a state of the terminal and a fusing portion viewed from the upper side in FIG. 3.

IG. 7 is a diagram illustrating a state of the two terminals 31 and the fusing portion 32 viewed from the upper side in FIG. 3. As shown in FIGS. 6 and 7, the terminals 31 each have a long plate shape. The plate surfaces of the two terminals 31 are aligned, and FIG. 6 shows the plate surfaces of the two terminals 31. One end portion of each of the two terminals 31 protrudes downward in FIG. 6 from the common surface (open surface) of the housing 30.

The plate surfaces of the two terminals 31 are preferably located on the same plane.

As described above, because the terminals 31 each have a long plate shape, the fuse 21 is a blade-type fuse. Generally, the cross-sectional area of a terminal of a blade-type fuse is larger than the cross-sectional area of a terminal of a chip-type fuse. For this reason, a blade type fuse can be used as a fuse of a circuit in which a large current flows when the state of the circuit is normal.

In each terminal 31, an end portion of a second plate portion 41 having a long plate shape is coupled to an end portion of a first plate portion 40 having a long plate shape. A part of the first plate portion 40 is covered with the housing 30. A first end portion of the first plate portion 40 protrudes downward in FIG. 6 from the above-described common surface of the housing 30. The common surface of the housing 30 and the distal end surface of the first end portion of the first plate portion are parallel to each other. With regard to the two terminals 31, the distal end surfaces of the first end portions of the two first plate portions 40 are located on the same plane.

Note that the parallelism of the common surface and the distal end surfaces does not mean only perfect parallelism, and they may be substantially parallel to each other. Accordingly, a state in which the common surface and the distal end surfaces are parallel to each other also includes a state in which the angle formed by the common surface and the distal end surfaces is a value within a design error range. In addition, the fact that the two distal end surfaces are located on the same plane means that there is substantially no level difference between the two distal end surfaces. Accordingly, when the level difference between the two distal end surfaces is a value within a design error range, it means that the two distal end surfaces are located on the same plane.

In each terminal 31, the second plate portion 41 protrudes from a part of the distal end surface of the first end portion of the first plate portion 40 along the length direction of the first plate portion 40. The cross-sectional area of the second plate portion 41 is smaller than the cross-sectional area of the first plate portion 40, and the second plate portion 41 is thinner than the first plate portion 40. The first plate portion 40 and the second plate portion 41 have the same thickness, and the plate surfaces of the first plate portion 40 and the second plate portion 41 are continuous with each other. The longitudinal directions of the first plate portion and the second plate portion 41 coincide with each other, and are the vertical directions in FIGS. 3, 4, and 6. The cross-sectional areas of the first plate portion and the second plate portion 41 are areas of cross-sections obtained by cutting the first plate portion 40 and the second plate portion 41 along the width direction, that is, the left-right direction in FIGS. 3, 4, and 6.

Note that the thicknesses of the first plate portion 40 and the second plate portion 41 are not necessarily equal to each other completely, but may be substantially equal to each other. Accordingly, the state in which the thicknesses of the first plate portion 40 and the second plate portion 41 are equal to each other also includes a state in which a difference between the two thicknesses is within an error range. In addition, the two longitudinal directions do not necessarily coincide with each other completely, but may substantially coincide with each other. Accordingly, the state in which the two longitudinal directions coincide with each other also includes a state in which the angle formed by the two longitudinal directions is within an error range.

In each of the two terminals 31, the second plate portion 41 protrudes from the central portion in the arrangement direction of the two terminals 31 on the distal end surface of the first end portion of the first plate portion 40. Here, the arrangement direction is the horizontal direction in FIG. 6. As shown in FIGS. 3 and 4, the distal end portion of the second plate portion 41 has a truncated pyramid shape, and the second plate portion 41 has a large cross-sectional area at a portion close to the housing 30 and a small cross-sectional area at a portion far from the housing 30.

As shown in FIGS. 6 and 7, the rod-shaped fusing portion 32 is disposed between the first plate portions 40 of the two terminals 31. One end portion of the fusing portion 32 is connected to a side surface of the first plate portion 40 of the one terminal 31. The other end portion of the fusing portion 32 is connected to a side surface of the first plate portion 40 of the other terminal 31. The two side surfaces to which the fusing portion 32 is connected face each other. The fusing portion 32 is bent and forms a V-shape as a whole. In the example shown in FIG. 6, the fusing portion 32 is bent upward in FIG. 6.

The shape of the fusing portion 32 is not limited to a V-shape, and may be an S-shape, for example.

As shown in FIGS. 6 and 7, two openings 60 are provided in a surface of the housing 30 opposite to the above-described common surface, that is, the upper surface in FIG. 6. The second end portions of the first plate portions 40 of the two terminals 31 face the two openings 60. A user of the fuse 21 measures the resistance value between the two terminals 31 using a tester, for example. The user can confirm whether or not the fusing portion 32 has been fused, based on the measured resistance value.

Mount State of Fuse 21

Figure 8:
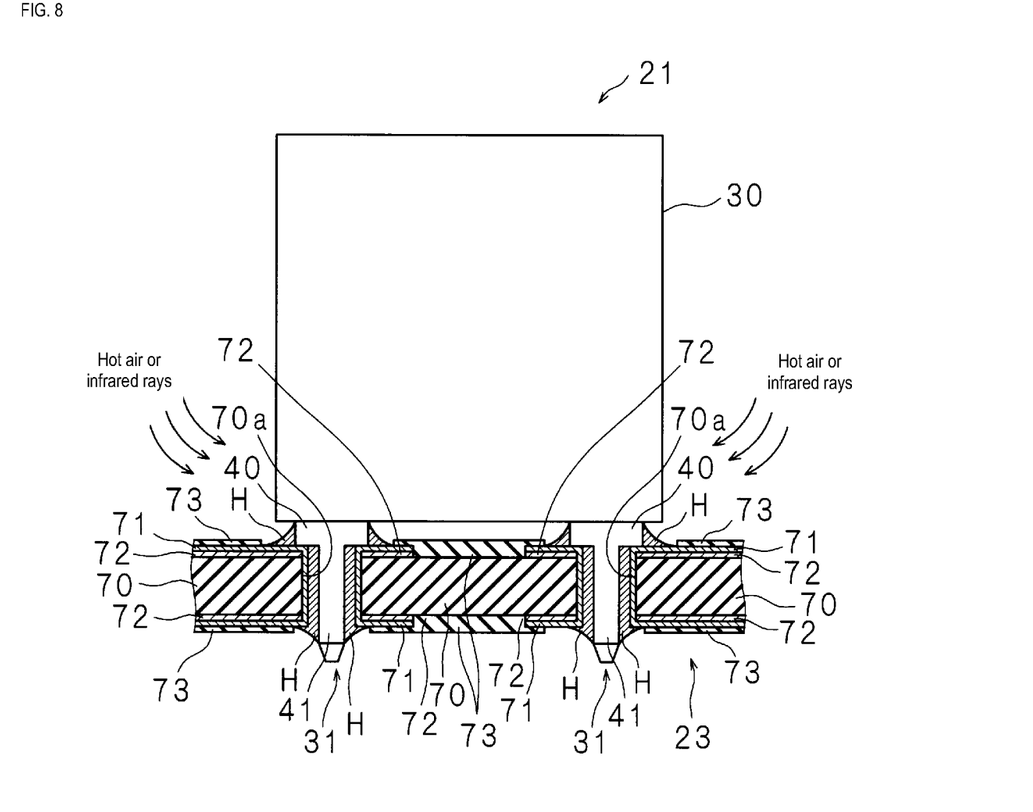
FIG. 8 is a diagram illustrating a state in which the fuse is mounted on a circuit board.
Figure 9:
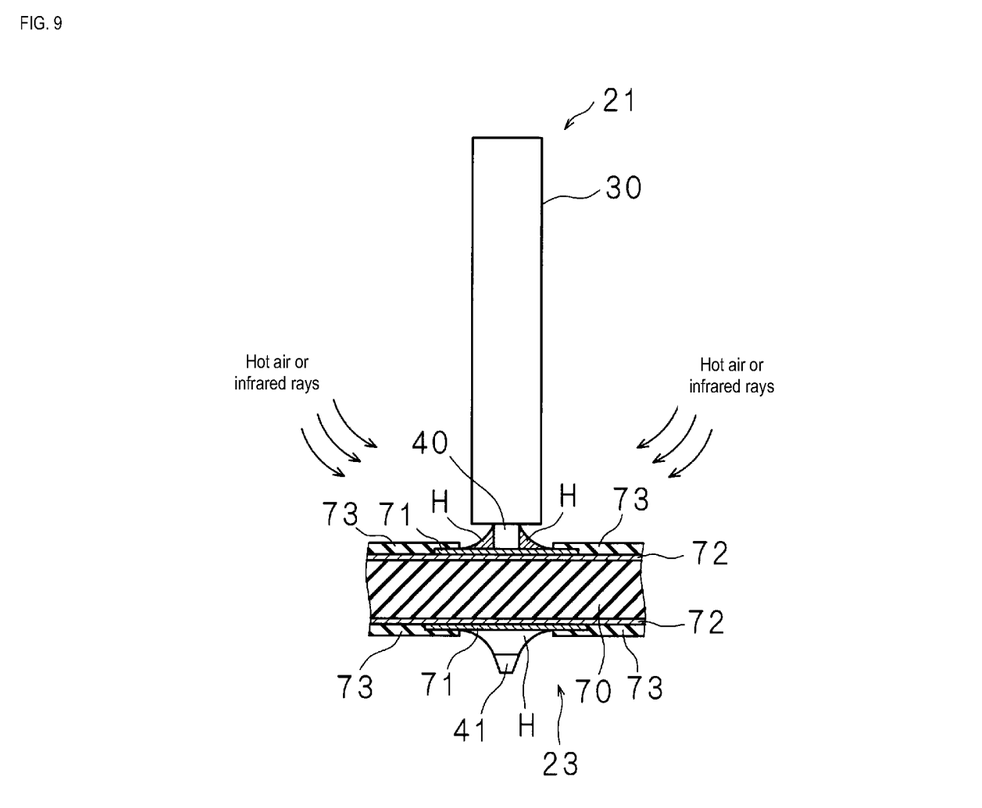
FIG. 9 is another diagram illustrating a state in which the fuse is mounted on the circuit board.

FIG. 8 is a diagram illustrating a state in which the fuse 21 is mounted on the circuit board 23. FIG. 9 is another diagram illustrating a state in which the fuse 21 is mounted on the circuit board 23. The circuit board 23 is a so-called printed board. The fuse 21 is mounted on the circuit board 23 using solder H. FIGS. 8 and 9 show a state after the fuse 21 has been mounted on the circuit board 23 using the solder H. In FIGS. 8 and 9, the cross-section of the circuit board 23 is illustrated. As shown in FIGS. 8 and 9, the circuit board 23 includes an insulating substrate 70. The insulating substrate 70 is provided with two through holes 70a passing through the insulating substrate 70 from the front side plate surface to the back side plate surface. The number of the through holes 70a is larger than or equal to the number of the terminals 31 provided in the fuse 21. The opening of each through hole 70a has a circular shape. In FIGS. 8 and 9, an upper plate surface of the insulating substrate 70 is the front plate surface, and a lower plate surface thereof is the back plate surface.

A plurality of conductive wiring patterns 72 are disposed on the front plate surface of the insulating substrate 70. A plurality of wiring patterns 72 are also disposed on the back plate surface of the insulating substrate 70. The inner surface of each through hole 70a of the circuit substrate 23 is covered with plating that forms substrate plating portions 71. The substrate plating portions 71 have conductivity. The peripheral edge portions of the through holes 70a on the front plate surface and the back plate surface are covered with the wiring patterns 72. In addition to the inner surfaces of the through holes 70a, the substrate plating portions 71 cover the peripheral edge portions of the through holes 70a on the front plate surface and the back plate surface via the wiring patterns 72, respectively. In FIG. 8, the substrate plating portions 71 cover the peripheral edge portions of the through holes 70a from the upper sides of the wiring patterns 72, and also cover the peripheral edge portions of the respective through holes 70a from the lower sides of the wiring patterns 72.

The substrate plating portions 71 contain a tin component, for example. The wiring patterns 72 are made of copper, for example. The substrate plating portions 71 are in contact with the wiring patterns 72, and are electrically connected to the wiring patterns 72, respectively. In each of the substrate plating portions 71, portions other than the inner surface and the peripheral portion of the through hole 70a are covered with a resist 73 having an insulating property.

In each through hole 70a, the area of the through hole 70a is slightly larger than the cross-sectional area of the second plate portion 41 of the terminal 31. Accordingly, the second plate portion 41 of the terminal 31 can be inserted into the through hole 70a. Because the first plate portion 40 is sufficiently long, when the second plate portion 41 is inserted into the through hole 70a, the first plate portion of the terminal 31 does not pass through the through hole 70a, but comes into contact with the substrate plating portion 71 covering the peripheral edge portion of the through hole 70a. In addition, because the distal end surfaces of the first end portions of the two first plate portions 40 are located on the same plane, the fuse 21 is supported by the circuit board 23 in a stable state.

When the fuse 21 is mounted on the circuit board 23, the paste-like solder H is applied onto the substrate plating portions 71 covering the front plate surface of the insulating substrate 70. In a state where the solder H is applied on the substrate plating portions 71, the second plate portions 41 of the two terminals 31 are respectively inserted into the two through holes 70a from the front side of the insulating substrate 70, that is, from the upper side in FIGS. 8 and 9. At this time, the first plate portions 40 of the two terminals 31 are supported by the substrate plating portions 71 covering the front plate surface. A part of each second plate portion 41 is exposed from the back plate surface of the circuit board 23.

In this state, the fuse 21 and the circuit board 23 are passed through a reflow furnace. In the reflow furnace, hot air is blown onto the fuse 21 and the circuit board 23, or the fuse 21 and the circuit board 23 are irradiated with infrared rays. As a result, the paste-like solder H melts, and the solder H connects the terminals 31 and the substrate plating portions 71. Specifically, as shown in FIGS. 8 and 9, in each terminal 31, a part of the solder H adheres to the plate surface and the end surface of the first plate portion 40 of the terminal 31 exposed from the housing 30 along the axial direction of the first plate portion 40, and adheres to the substrate plating portion 71 covering the front side plate surface of the insulating substrate 70.

In addition, a part of the melted solder H enters each through hole 70a and adheres to the substrate plating portion 71 covering the inner surface of the through hole 70a and the plate surface and the end surface of the second plate portion 41 of each of the terminals 31. The solder H has conductivity. The terminal 31 and the substrate plating portion 71 are electrically connected to each other through the solder H. The two terminals 31 provided on the fuse 21 are connected to the two substrate plating portions 71 provided on the circuit substrate 23 using the solder H.

In the power supply control device 10, the fuse 21 is mounted on the circuit board 23 as described above. The two terminals 31 are respectively inserted into the two through holes 70a. The two terminals 31 are respectively connected to the two substrate plating portions 71 using the solder H.

In an example of a reflow method, the circuit board 23 on which the fuse 21 is mounted passes through a first region and a second region in this order in a reflow furnace. The temperature of the first region is within a range of 170 degree Celsius to 190 degree Celsius. The circuit board 23 is located in the first region for 80 seconds to 140 seconds. The temperature of the second region is within a range of 230 degree Celsius to 250 degree Celsius. The circuit board 23 is located in the second region for 60 seconds to 90 seconds.

When the fuse 21 is mounted on the circuit board 23 by a reflow method, hot air is blown onto the housing 30 or the housing 30 is irradiated with infrared rays/infrared rays are irradiated to the housing 30. At this time, the temperature of the housing 30 rises. When the temperature of the housing 30 is lower than or equal to X degree Celsius, no deformation or melting occurs in the housing 30. Here, X is a positive real number. When no deformation or melting occurs in the housing 30, the shape of the housing 30 is maintained. The housing 30 being heat resistant means that X is higher than or equal to 250. The housing 30 of the fuse 21 is heat-resistant. Accordingly, when the temperature of the housing 30 is lower than or equal to 250 degree Celsius, the housing 30 is not deformed or melted, and the shape of the housing 30 is maintained. Accordingly, the housing 30 is not melted or deformed by being blown with hot air or being irradiated with infrared rays. The fuse 21 has a configuration suitable to be mounted on the circuit board 23 by a reflow method.

When the temperature of the fuse 21 is lower than or equal to Y degree Celsius, the fusing characteristics of the fuse 21 do not substantially change, and the long-term reliability of the fuse 21 does not substantially decrease. The heat resistance of the fuse 21 means that Y is 250 or larger. Not only the housing 30 but also the fuse 21 is heat-resistant. Accordingly, if the temperature of the fuse 21 is lower than or equal to 250 degree Celsius, the fusing characteristics of the fuse 21 do not substantially change, and the long-term reliability of the fuse 21 does not substantially decrease. The fusing characteristic indicates a relationship between a current flowing through the fuse 21 and a fusing time from when the current flows to when the fusing portion 32 starts being fused. In the fusing characteristics, fusing times with respect to various currents are shown. The long-term reliability is a life of the fuse 21 in which the fuse 21 normally functions according to the standard of the specification. It is not preferable that the life of the fuse 21 is shortened by the fuse 21 being mounted on the circuit board 23 by a reflow method. Examples of the heat-resistant resin used for manufacturing the housing include a nylon resin.

The housing 30 preferably has a heat resistance of 300 degree Celsius or higher. The heat resistance of 300 degree Celsius or higher of the housing 30 means that the aforementioned X is 300 or larger. When the housing 30 has a heat resistance of 300 degree Celsius or higher, the fuse 21 has a configuration very suitable to be mounted on the circuit board 23 by a reflow method.

The fuse 21 also preferably has a heat resistance of 300 degree Celsius or higher. The heat resistance of 300 degree Celsius or higher of the fuse 21 means that the aforementioned Y is 300 or larger.

As described above, in each terminal 31, the surface of the metal body 50 is covered with the terminal plating 51 made of tin. The solder H usually contains a tin component. Accordingly, the terminal 31 covered with the terminal plating 51 made of tin is easily compatible with the solder H, that is, has high wettability. For this reason, the solder H is strongly adhered to the terminal 31.

The material of the terminal plating 51 is not limited to tin, and may also be an alloy containing a tin component, for example.

As described above, in each terminal 31, the second plate portion 41 protrudes from the distal end surface of the first plate portion 40, and a level difference is formed therebetween. The first plate portion 40 does not pass through the through hole 70a, but contacts the substrate plating portion 71 on the insulating substrate 70. With this configuration, the housing 30 is separated from the circuit board 23. In this case, when the terminal 31 is soldered to the circuit board 23 using the solder H, the solder H having a fillet shape is easily formed. The formation of the fillet-shaped solder H means that the terminal 31 is well soldered to the circuit board 23.

In addition, the terminals 31 are inserted into the respective through holes 70a in a state where the paste-like solder H is applied on the substrate plating portions 71. As described above, because a level difference is formed between the first plate portion 40 and the second plate portion 41, the housing 30 does not come into contact with the solder paste H when the terminals 31 are inserted into the respective through holes 70a. For this reason, when the solder H is melted by a reflow method, there is a low possibility that the solder H having a ball shape is formed.

As described above, in each terminal 31, the cross-sectional area of the second plate portion 41 is smaller than the cross-sectional area of the first plate portion 40, and the second plate portion 41 is thin. Accordingly, as each through hole 70a, a through hole having a small area can be used. In this case, the gap between the second plate portion 41 and the through hole 70a is small. For this reason, for example, even when hot air is blown onto the housing 30, the second plate portion 41, that is, the fuse 21, is not largely inclined, and the housing 30 stands substantially perpendicular to the plate surface of the circuit board 23. As a result, when the fuse 21 is mounted on the circuit board 23 by a reflow method, it is not necessary to fix the housing 30 of the fuse 21 substantially perpendicular to the plate surface of the circuit board 23 with a jig, and the fuse 21 can be mounted on the circuit board 23 at low cost.

Second Embodiment

In the first embodiment, the fuse 21 is disposed on the upstream side of the semiconductor switch 20 in the current path of the current flowing from the positive electrode of the DC power source 11 to the one end of the load 12. However, the fuse 21 is not necessarily disposed on the upstream side of the semiconductor switch 20.

Hereinafter, points of the second embodiment that are different from the first embodiment will be described. Configurations aside from those described hereinafter are the same as in the first embodiment. For this reason, constituent elements that are the same as in the first embodiment will be given the same reference signs as in the first embodiment, and descriptions thereof will be omitted.

Configuration of Power Supply Control Device 10

Figure 10:
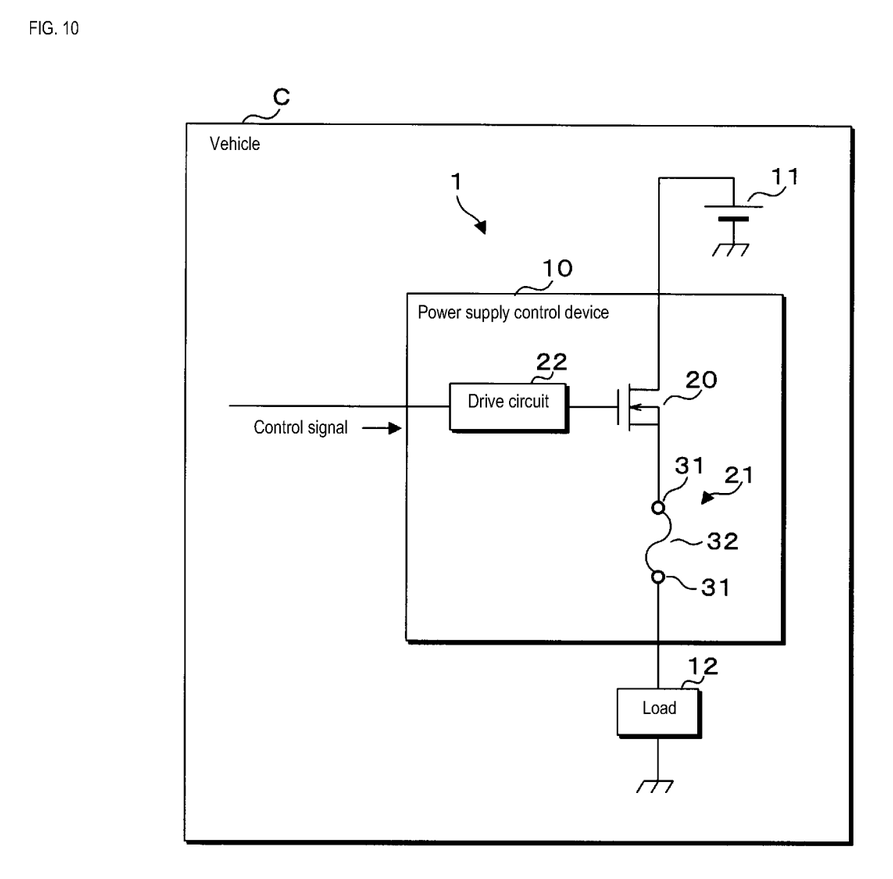
FIG. 10 is a block diagram showing a configuration of main portions of a power supply control device according to a second embodiment.

FIG. 10 is a block diagram showing a configuration of main portions of a power supply control device 10 according to a second embodiment. When the power supply control device 10 according to the second embodiment is compared with the power supply control device 10 according to the first embodiment, the position where the fuse 21 is disposed is different. In the second embodiment, the semiconductor switch 20 and the drive circuit 22 are connected in the same manner as in the first embodiment.

The drain of the semiconductor switch 20 is connected to the positive electrode of the DC power source 11. One terminal 31 of the fuse 21 is connected to the source of the semiconductor switch 20. The other terminal 31 of the fuse 21 is connected to one end of the load 12.

When the drive circuit 22 turns ON the semiconductor switch 20, a current flows from the positive electrode of the DC power source 11 to the semiconductor switch 20, the fuse 21, and the load 12 in this order, and power is supplied to the load 12. In the fuse 21, the current flows through the one terminal 31, the fusing portion 32, and the other terminal 31 in this order as in the first embodiment. When the drive circuit 22 turns OFF the semiconductor switch 20, the current stops flowing through the semiconductor switch 20 and the fuse 21, and the supply of power to the load 12 is stopped.

As described above, in the power supply control device 10 according to the second embodiment, the fuse 21 is disposed on the downstream side of the semiconductor switch 20 in the current path of the current flowing from the positive electrode of the DC power source 11 to the load 12. Therefore, the power supply control device 10 according to the second embodiment similarly achieves the effect of the power supply control device 10 according to the first embodiment.

Third Embodiment

The power supply control device 10 according to the second embodiment may have a function of detecting a current.

Hereinafter, points of the third embodiment that are different from the second embodiment will be described. Configurations aside from those described hereinafter are the same as in the second embodiment. For this reason, constituent elements that are the same as in the second embodiment will be given the same reference signs as in the second embodiment, and descriptions thereof will be omitted.

Configuration of Power Supply Control Device 10

Figure 11:
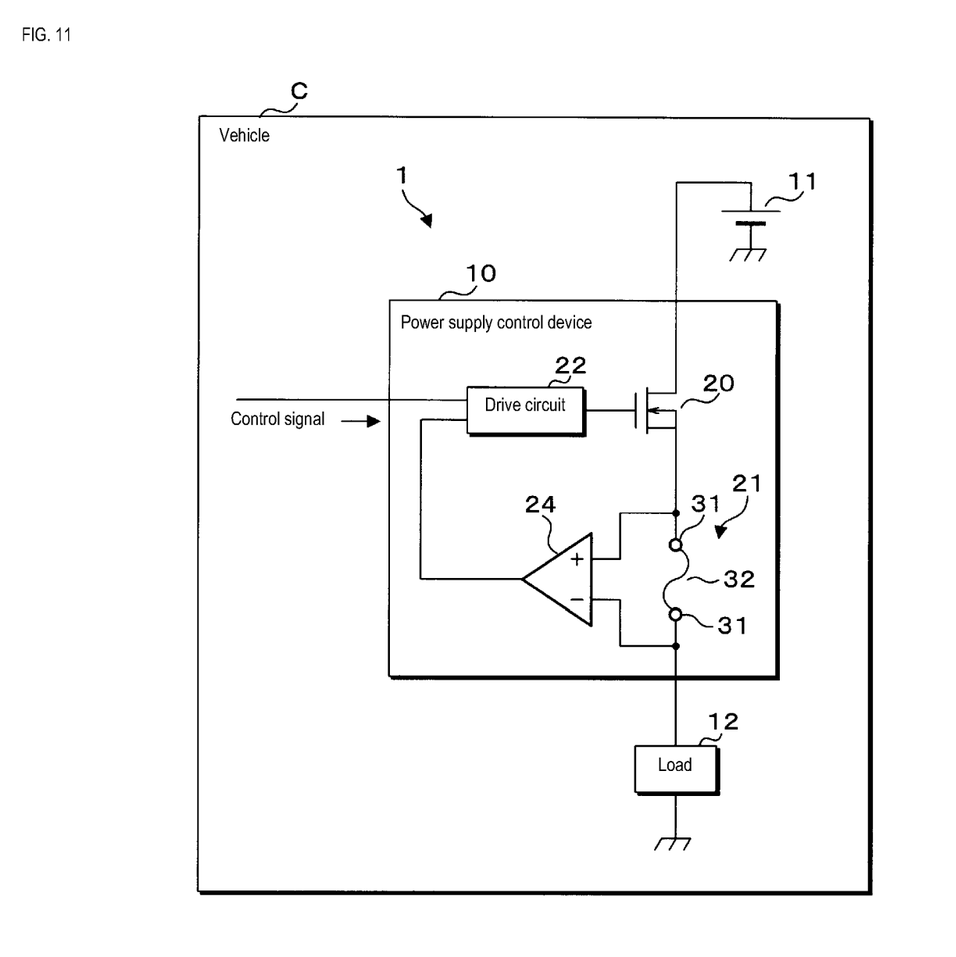
FIG. 11 is a block diagram showing a configuration of main portions of a power supply control device according to a third embodiment.

FIG. 11 is a block diagram showing a configuration of main portions of a power supply control device 10 according to a third embodiment. In comparison between the power supply system 1 according to the third embodiment and the power supply system 1 according to the second embodiment, the configuration of the power supply control device 10 is different. The power supply control device 10 according to the third embodiment has the same components as those of the power supply control device 10 according to the second embodiment. The power supply control device 10 according to the third embodiment further includes a differential amplifier 24. The differential amplifier 24 has a plus terminal, a minus terminal, and an output terminal.

A connection node between the semiconductor switch 20 and the fuse 21 is connected to the plus terminal of the differential amplifier 24. A connection node between the semiconductor switch 20 and the load 12 is connected to the minus terminal of the differential amplifier 24. The output terminal of the differential amplifier 24 is connected to the drive circuit 22.

The fusing portion 32 of the fuse 21 has a resistance component. Accordingly, when a current flows through the fuse 21, a voltage drop occurs in the fuse 21. The differential amplifier 24 amplifies the voltage value between the two terminals 31 of the fuse 21, and outputs the amplified current value to the drive circuit 22. Hereinafter, the voltage value between the two terminals 31 of the fuse 21 will be referred to as a "fuse voltage value". The amplification factor of the differential amplifier 24 is a constant value. The voltage value output from the differential amplifier 24 is represented by the product of the fuse voltage value and the amplification factor. The voltage value output by the differential amplifier 24 is higher, as the fuse voltage value is higher. Accordingly, the voltage value output by the differential amplifier 24 indicates the fuse voltage value. The differential amplifier 24 functions as a detection unit that detects a fuse voltage value. The fusing portion 32 of the fuse 21 is used as a resistor for detecting a fuse voltage value.

A current flows through the semiconductor switch 20 and the fuse 21. Hereinafter, the current value of a current flowing through the semiconductor switch 20 is referred to as a "switch current value". The fuse voltage value is represented by the product of the resistance value of the fusing portion 32 and the switch current value.

Accordingly, the output voltage value of the differential amplifier 24 is represented by the product of the switch current value, the resistance value of the fusing unit 32, and the amplification factor of the differential amplifier 24. The output voltage value of the differential amplifier 24 is higher, as the switch current value is larger. Accordingly, the output voltage value of the differential amplifier 24 indicates the switch current value. The fuse 21 also functions as a shunt resistor for detecting a switch current value.

When the output voltage value of the differential amplifier 24 is lower than a certain reference voltage value, as in the second embodiment, the drive circuit 22 turns the semiconductor switch 20 ON or OFF depending on the voltage of the control signal. When the output voltage value of the differential amplifier 24 becomes higher than or equal to the reference voltage value, the drive circuit 22 turns OFF the semiconductor switch 20 regardless of the voltage of the control signal. Thereafter, the drive circuit 22 maintains the semiconductor switch 20 in the OFF state.

When the output voltage value of the differential amplifier 24 is the reference voltage value, the switch current value is represented by (reference voltage value)/((resistance value of the fusing portion 32). (amplification factor of the differential amplifier 24). Here, "·" represents multiplication. The switch current value when the output voltage value of the differential amplifier 24 is the reference voltage value is referred to as a "current threshold value". As described above, when the output voltage value of the differential amplifier 24 becomes larger than or equal to the reference voltage value, the drive circuit 22 turns OFF the semiconductor switch 20. Accordingly, the switch current value does not become larger than or equal to the current threshold value. As a result, an overcurrent is prevented from flowing via the semiconductor switch 20. Therefore, in the power supply control device 10 according to the third embodiment, the fuse 21 and the drive circuit 22 prevent an overcurrent from flowing.

Therefore, the power supply control device 10 according to the third embodiment similarly achieves the effect of the power supply control device 10 according to the second embodiment.

The fuse 21 is not necessarily disposed on the downstream side of the semiconductor switch 20, and may also be disposed on the upstream side of the semiconductor switch 20. In this configuration, the differential amplifier 24 is further provided in the power supply control device 10 according to the first embodiment. When the fuse 21 is disposed on the upstream side of the semiconductor switch 20, the plus terminal of the differential amplifier 24 is connected to a connection node between the DC power source 11 and the fuse 21. The minus terminal of the differential amplifier 24 is connected to a connection node between the fuse 21 and the semiconductor switch 20.

Modifications

In the first to third embodiments, the number of terminals 31 included in the fuse 21 is not limited to two, and may also be three or more. When the fuse 21 has three terminals 31, for example, the three terminals 31 are arranged in a line in the left-right direction in a state where plate surfaces of them are aligned. One fusing portion 32 is connected to a left terminal 31 and a center terminal 31. The other fusing portion 32 is connected to the center terminal 31 and a right terminal 31. The positive electrode of the DC power source 11 is connected to the center terminal 31. When the fuse 21 has three terminals 31, the power supply system 1 has two loads 12. The power supply control device 10 includes two semiconductor switches 20 and two drive circuits 22.

The center terminal 31 of the fuse 21 is connected to the positive electrode of the DC power source 11. The drain, the source, and the gate of one semiconductor switch 20 are connected to the left terminal 31 of the fuse 21, one end of one load 12, and one drive circuit 22, respectively. The drain, the source, and the gate of the other semiconductor switch 20 are connected to the right terminal 31 of the fuse 21, one end of the other load 12, and the other drive circuit 22, respectively. The other ends of the two loads 12 are grounded.

When the one semiconductor switch 20 is turned ON, a current flows from the positive electrode of the DC power source 11 to the one fusing portion 32 of the fuse 21, the semiconductor switch 20, and the load 12 in this order. When the other semiconductor switch 20 is turned ON, a current flows from the positive electrode of the DC power source 11 to the other fusing portion 32 of the fuse 21, the semiconductor switch 20, and the load 12 in this order. The two drive circuits 22 respectively turn the two semiconductor switches 20 ON or OFF in accordance with the instruction of the control signal. With this configuration, power supply to the two loads 12 is individually controlled.

When the fuse 21 has three terminals 31 in the third embodiment, the power supply control device 10 includes two differential amplifiers 24. The plus terminal, the minus terminal, and the output terminal of one differential amplifier 24 are connected to the center terminal 31 and the left terminal 31 of the fuse 21, and one drive circuit 22, respectively. The plus terminal, the minus terminal, and the output terminal of the other differential amplifier 24 are connected to the center terminal 31 and the right terminal 31 of the fuse 21, and the other drive circuit 22, respectively. The drive circuits 22 respectively turn OFF the semiconductor switches 20 in accordance with the output voltage value of the respective differential amplifiers 24, as in the third embodiment.

In the third embodiment, the fuse voltage value detected by the differential amplifier 24 may also be used to calculate the electric wire temperature of an electric wire disposed in the current path of the current flowing through the fuse 21. In this case, for example, the fuse voltage value is input to a microcomputer. The microcomputer calculates the switch current value from the fuse voltage value, and calculates the electric wire temperature based on the calculated switch current value. If the electric wire temperature is high, the microcomputer instructs the drive circuit 22 to turn OFF the semiconductor switch 20.

In the first to third embodiments, the configuration of the terminal 31 is not limited to the configuration in which the second plate portion 41 protrudes from the distal end surface of the first plate portion 40. The terminal 31 may also be constituted by a sufficiently long first plate portion 40. In this case, the opening of the through hole 70a has a rectangular shape, and the first plate portion 40 is inserted into the through hole 70a of the circuit board 23. The first plate portion is connected to the substrate plating portion 71 using the solder H.

In the first to third embodiments, the semiconductor switch 20 is not limited to an N-channel FET, and may also be, for example, a P-channel FET, an insulated gate bipolar transistor (IGBT), or a bipolar transistor. Also, instead of the semiconductor switch 20 and the drive circuit 22, an intelligent power device (IPD) may be used. In this case, the IPD is mounted on the plate surface of the circuit board 23.

The first to third embodiments that were disclosed are to be considered exemplary in all respects and in no way limiting. The scope of the present disclosure is indicated by the claims rather than by the foregoing description, and all changes which come within the meaning and range of equivalency of the claims are intended to be embraced therein.

The invention claimed is:

1. A vehicle power supply control device that controls power supply via a semiconductor switch by switching the semiconductor switch ON or OFF, comprising:
a fuse; and
a circuit board on which the semiconductor switch and the fuse are mounted, the circuit board including an insulating substrate, a pair of through holes passing through the insulating substrate and a plurality of substrate plating portions covering the insulating substrate, wherein the each of the pair of through holes has a first length,
wherein the fuse includes:
a pair of long plate-shaped terminals arranged in a row, the pair of long plate-shaped terminals includes a first plate portion and a second plate portion extending from the first plate portion, the first plate portion having a length longer than the first length of the pair of through holes and a width of the first plate portion is the same as a width of the second plate portion;
a fusing portion connected to two terminals of the plurality of terminals; and
a housing covering the fusing portion and a part of the terminals, and
the two terminals of the plurality of terminals are arranged in a current path of a current flowing through the semiconductor switch,
the current flows through the fusing portion,
the fusing portion is fused when a temperature of the fusing portion exceeds a predetermined temperature, and
the housing is heat-resistant; and
wherein a distal end of the first plate portion is pressed against a top surface of a top one of the plurality of substrate plating portions and the first plate portion of the pair of terminals respectively connected to the substrate plating portions by soldering and the second plate portion of the pair of terminals are disposed within the pair of through holes and connected within the pair of through holes by soldering.

2. The power supply control device according to claim 1, wherein the housing has heat resistance to heat of 300 degree Celsius or higher.

3. The power supply control device according to claim 1, further comprising:
a detection unit configured to detect a voltage value between the two terminals of the fuse disposed in the current path.

4. The power supply control device according to claim 1, wherein the plurality of terminals each include:
a metal body; and
terminal plating made of tin and covering a surface of the metal body.

5. The power supply control device according to claim 1, a cross-sectional area of the second plate portion is smaller than a cross-sectional area of the first plate portion.

6. The power supply control device according to claim 2, further comprising:
a detection unit configured to detect a voltage value between the two terminals of the fuse disposed in the current path.

7. The power supply control device according to claim 2, wherein the plurality of terminals each include:
a metal body; and
terminal plating made of tin and covering a surface of the metal body.

8. The power supply control device according to claim 3, wherein the plurality of terminals each include:
a metal body; and
terminal plating made of tin and covering a surface of the metal body.

9. The power supply control device according to claim 2, wherein a cross-sectional area of the second plate portion is smaller than a cross-sectional area of the first plate portion.

10. The power supply control device according to claim 3, wherein a cross-sectional area of the second plate portion is smaller than a cross-sectional area of the first plate portion.

11. The power supply control device according to claim 4, wherein a cross-sectional area of the second plate portion is smaller than a cross-sectional area of the first plate portion.

* * * * *